(12) United States Patent
Shibasaki

(10) Patent No.: US 7,760,462 B2
(45) Date of Patent: Jul. 20, 2010

(54) METHOD OF CONTROLLING FLYING HEIGHT OF HEAD SLIDER AND INFORMATION STORAGE APPARATUS

(75) Inventor: Takeshi Shibasaki, Kawasaki (JP)

(73) Assignee: Toshiba Storage Device Corporation, Tokyo (JP)

(*) Notice: Subject to any disclaimer, the term of this patent is extended or adjusted under 35 U.S.C. 154(b) by 0 days.

(21) Appl. No.: 12/406,284

(22) Filed: Mar. 18, 2009

(65) Prior Publication Data

US 2009/0237830 A1    Sep. 24, 2009

(30) Foreign Application Priority Data

Mar. 18, 2008    (JP)    ............... 2008-069357

(51) Int. Cl.
*G11B 21/02*    (2006.01)
(52) U.S. Cl. ..................................... 360/75
(58) Field of Classification Search .................. None
See application file for complete search history.

(56) References Cited

U.S. PATENT DOCUMENTS 6,151,183 A    11/2000    Ogasawara et al.

2004/0125478 A1    7/2004    Kim et al.
2009/0122444 A1*    5/2009    Ma et al.    ................. 360/97.02

FOREIGN PATENT DOCUMENTS

| JP | 2983009 B | 9/1999 |
|---|---|---|
| JP | 2002-150744 A | 5/2002 |
| JP | 3927538 B | 3/2007 |

* cited by examiner

*Primary Examiner*—Andrew L Sniezek
(74) *Attorney, Agent, or Firm*—Greer, Burns & Crain, Ltd.

(57) ABSTRACT

One aspect of the embodiments is related to a method of controlling a flying height of a head slider. The method includes the steps of measuring a first correlation value between an air pressure and a heating element sensitivity of the head slider, measuring a second correlation value between the air pressure and the flying height of the head slider, calculating a reference heating-element sensitivity at normal air pressure from the first correlation value, measuring a heating element sensitivity of the heating element when the head slider is lifted, calculating the difference between the heating element sensitivity and the reference heating-element sensitivity to calculate an amount of variation in air pressure from the first correlation value, and calculating an amount of variation in the flying height of the head slider from the amount of variation in air pressure and the second correlation value and controlling the heating element.

4 Claims, 7 Drawing Sheets

METHOD OF CONTROLLING FLYING HEIGHT OF HEAD SLIDER AND INFORMATION STORAGE APPARATUS

CROSS-REFERENCE TO RELATED APPLICATIONS

This application is based upon and claims the benefit of priority of the prior Japanese Patent Application No. 2008-069357, filed on Mar. 18, 2008, the entire contents of which are incorporated herein by reference.

FIELD

The embodiments discussed herein are directed to a method of controlling the flying height of a head slider from a recording medium, such as a magnetic disk, and to an information storage apparatus adopting the method. The head slider is provided with a magnetic head recording information on the recording medium and playing back information thereon.

BACKGROUND

A large amount of information is routinely processed in the field of computers and hard disk drives (HDDs) are used as one type of information storage apparatus for recording and playing back such a large amount of information. A typical HDD includes a magnetic disk, which is a disc-shaped storage medium on which information is recorded in a state where the magnetic material is magnetized, and a magnetic head for recording information on the magnetic disk and playing back information.

The magnetic head applies the magnetic field corresponding to information to be recorded to the magnetic disk to record the information and detects a weak magnetic field emitted from the magnetized magnetic material in the magnetic disk to play back the information. The magnetic head is mounted on a head slider, which is a metal block, and the above processing is performed in a state where the head slider is floated over the magnetic disk, that is, the magnetic head is floated over the magnetic disk. The flying height of the portion where the magnetic head is mounted on the head slider from the magnetic disk in the recording or playback of information may vary due to, for example, the air flow between the surface of the magnetic disk rotating at high speed and the head slider. Excessive variation in the flying height of the portion where the magnetic head is mounted on the head slider undesirably causes degradation in the quality of the information that is recorded or played back.

The head slider is generally shaped such that the flying height of the entire head slider from the magnetic disk is stabilized. However, head sliders have been reduced in size in recent years and, therefore, it is difficult to stabilize the flying heights only by modifying the shapes of the head sliders.

The magnetic head is provided with a coil to generate the magnetic field for the recording of information. It is known that a phenomenon called Thermal Pole Tip Protrusion (TPTP) is caused in the recording of information, in which the portion where the magnetic head is mounted on the head slider is thermally expanded due to Joule heat caused by a current flowing through the coil. The expansion decreases the flying height of the portion where the magnetic head is mounted on the head slider from the magnetic disk (for example, refer to Japanese Patent No. 3927538).

In order to precisely control the flying height so as to be stabilized by positively utilizing the TPTP, for example, a flying-height control mechanism is proposed, in which a heater is embedded in the head slider, the TPTP is caused by heat generated by the heater, and the portion where the magnetic head is mounted on the head slider is precisely protruded toward and away from the surface of the magnetic disk to adjust the flying height of the portion where the magnetic head is mounted on the head slider.

Computers are used in various environments in recent years owing to the prevalence of the computers. The flying height of the head slider, described above, is strongly affected by the air pressure in the corresponding computer. When the air pressure in the computer is low because, for example, the computer is used at a higher altitude, the flying height of the head slider is generally lower than the flying height at normal air pressure. Accordingly, the adjustment of the flying height of the portion where the magnetic head is mounted on the head slider in the same manner as at the normal air pressure by such a flying-height control mechanism when the air pressure in the computer is very low can cause the portion where the magnetic head is mounted on the head slider to be too close to the magnetic disk. In an extreme case, a problem can be caused in which the portion where the magnetic head is mounted on the head slider contacts the magnetic disk.

It is desirable to keep track of the air pressure in the computer in order to adjust the flying height of the portion where the magnetic head is mounted on the head slider in accordance with such variation in the air pressure. Technologies for keeping track of the air pressure in the computer in related art include a technology in which the air pressure in the computer is calculated from the value of an operating current to a spindle motor rotating the magnetic disk based on the fact that the operating current to the spindle motor is affected by the viscosity of the air depending on the air pressure (for example, Japanese Unexamined Patent Application Publication No. 2002-150744), and a technology in which the air pressure in the computer is calculated from the value of an operating current to a mechanism for fixing the head slider at a certain position on the magnetic disk against the rotation of the magnetic disk based on the fact that the operating current to the mechanism is affected by the viscosity of the air depending on the air pressure (for example, refer to Japanese Patent No. 2983009).

However, it is not possible to precisely control the flying height of the portion where the magnetic head is mounted on the head slider by using the slight thermal expansion of the head slider with the methods disclosed in the above patent documents.

SUMMARY

In accordance with an aspect of the embodiments, there is provided a method of controlling a flying height of a head slider having a heating element that controls the flying height. The method includes the steps of measuring a first correlation value between an air pressure and a heating element sensitivity of the head slider, measuring a second correlation value between the air pressure and the flying height of the head slider, calculating a reference heating-element sensitivity at normal pressure from the first correlation value, measuring a heating element sensitivity of the heating element when the head slider is lifted, calculating the difference between the heating element sensitivity and the reference heating-element sensitivity to calculate an amount of variation in air pressure from the first correlation value, and calculating an amount of variation in the flying height of the head slider from the amount of variation in air pressure and the second correlation value and controlling the heating element to adjust the flying height of the head slider.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF THE PREFERRED EMBODIMENTS

In order to resolve the above problems, an object of the embodiments of the present invention is to provide a method of controlling the flying height of a head slider and an information storage apparatus adopting the method, which are capable of adjusting the flying height of the portion where the magnetic head is mounted on the head slider from a recording medium, such as a magnetic disk, with a higher sensitivity to the air pressure.

A method of controlling the flying height of a head slider and an information storage apparatus according to embodiments of the present invention will herein be described in detail with reference to the attached drawings.

Figure 1:
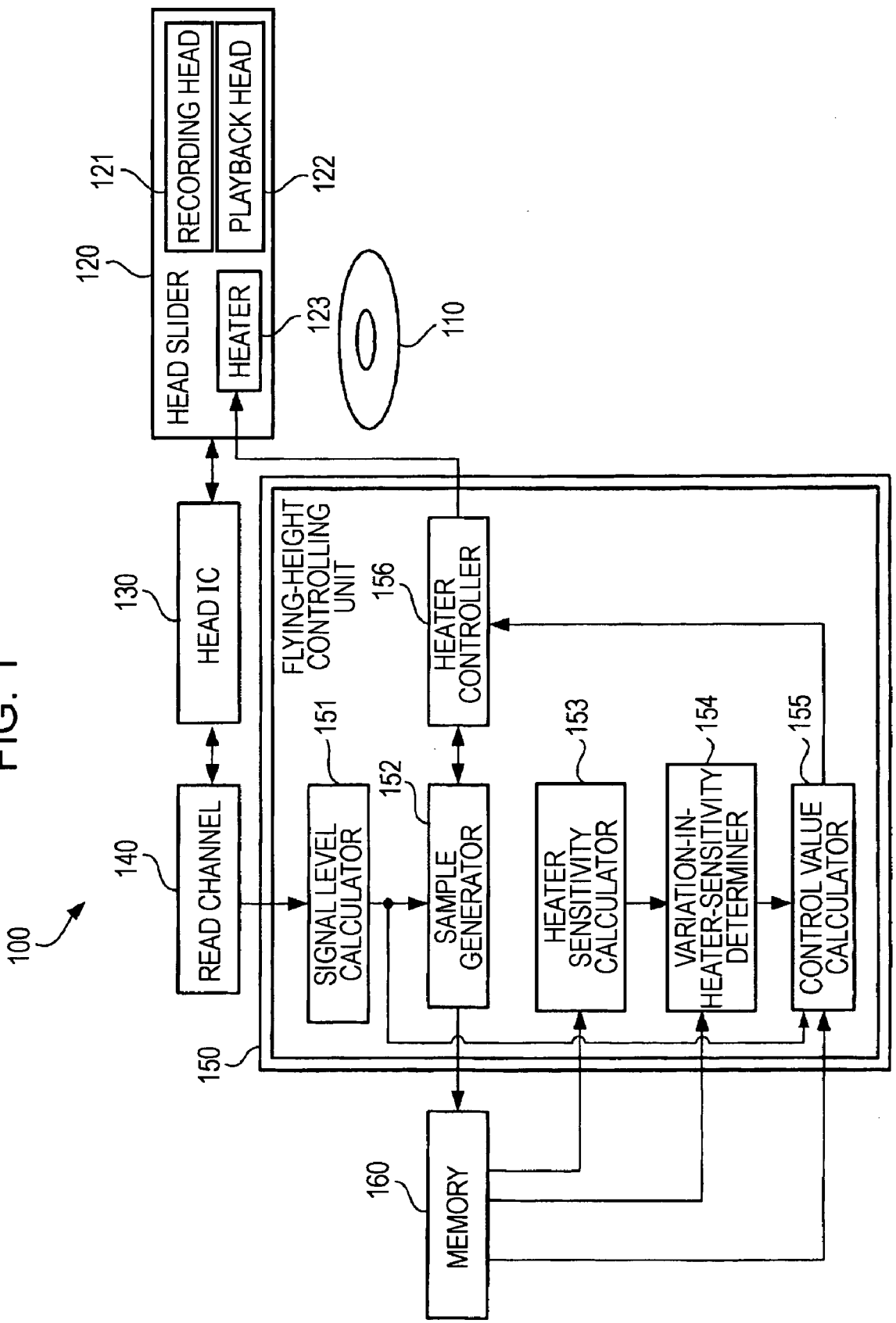
FIG. 1 is a block diagram depicting an example of the functional configuration of a magnetic disk apparatus embodying an information storage apparatus according to an embodiment of the present invention.

FIG. 1 is a block diagram depicting an example of the functional configuration of a magnetic disk apparatus embodying the information storage apparatus according to the embodiment of the present invention.

The functional blocks of a magnetic disk apparatus 100 are depicted in FIG. 1 focusing on a flying-height controlling function to adjust the flying height of a head slider 120 from a magnetic disk 110, which are described below. The components performing a function of playing back information and a function of recording information are omitted in FIG. 1 for simplicity.

The magnetic disk apparatus 100 is provided with the magnetic disk 110 and the head slider 120 to which a recording head 121 and a playback head 122 are mounted. The magnetic disk 110 is a disc-shaped storage medium on which information is recorded in a state where the magnetic material is magnetized. The recording head 121 is a magnetic head that records information on the magnetic disk 110 and the playback head 122 is a magnetic head that plays back information on the magnetic disk 110. The head slider 120 includes a heater 123 that heats the head slider 120 from the inside to thermally expand the portions to which the recording head 121 and the playback head 122 are mounted.

Figure 2:
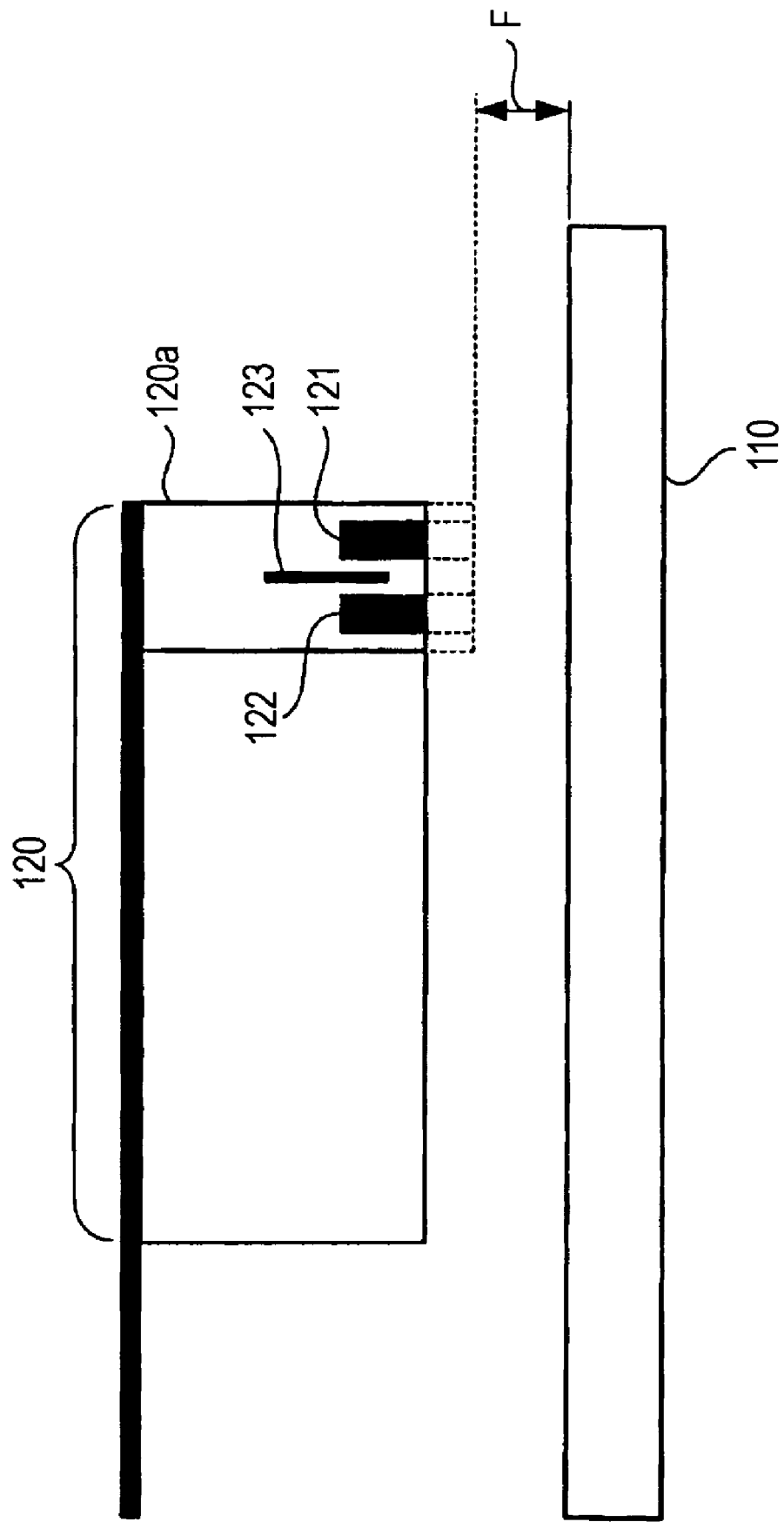
FIG. 2 is a cross-sectional view of a head slider depicted in FIG. 1.

FIG. 2 is a cross-sectional view of the head slider 120 depicted in FIG. 1.

Referring to FIG. 2, the recording head 121 and the playback head 122 are mounted to a tip section 120a of the head slider 120 and the heater 123 is provided between the recording head 121 and the playback head 122. When the heater 123 receives power supplied from the outside to generate heat, the tip section 120a of the head slider 120 is thermally expanded. As a result, the tip section 120a protrudes toward the magnetic disk 110 along with the recording head 121 and the playback head 122, as shown by dotted lines in FIG. 2. According to the present embodiment, a distance F between the tip section 120a of the head slider 120, to which the recording head 121 and the playback head 122 are mounted and which protrudes due to the thermal expansion, and the magnetic disk 110 is called the flying height of the head slider 120.

Since the strength of the magnetic field which the playback head 122 detects from the magnetic disk 110 in the playback of information is increased as the playback head 122 approaches the magnetic disk 110, the level of a playback signal detected by the playback head 122 in the playback of information is increased as the playback head 122 approaches the magnetic disk 110. The recording head 121 and the playback head 122 approach the magnetic disk 110 as the amount of protrusion of the tip section 120a of the head slider 120 is increased, that is, as the flying height of the head slider 120 is decreased. In other words, the level of the playback signal (the playback signal level) described above is increased as the flying height of the head slider 120 is decreased.

According to the present embodiment, the flying height of the head slider 120 when the heater 123 does not generate heat is set so that the playback signal level is sufficiently lower than a specific reference level. In the recording and playback of information, the flying height of the head slider 120 is adjusted to a reference flying height at which the playback signal level is equal to the reference level by adjusting the power to be supplied to the heater 123 in a manner described below.

Referring back to FIG. 1, the magnetic disk apparatus 100 also includes a head integrated circuit (IC) 130, a read channel 140, a flying-height controlling unit 150, and a memory 160. The head IC 130 controls the recording of information by the recording head 121 and the playback of information by the playback head 122. The playback signal detected by the playback head 122 is supplied to each part in the magnetic disk apparatus 100 through the read channel 140. The flying-height controlling unit 150 adjusts the power to be supplied to the heater 123 based on the playback signal supplied through the read channel 140 to adjust the flying height of the head slider 120 to the reference flying height. A variety of information used in the adjustment of the flying height in the flying-height controlling unit 150 is stored in the memory 160.

The magnetic disk 110 is an example of a "storage medium" in the information storage apparatus according to the embodiment of the present invention, and the head slider 120 is an example of a "head slider" in the method of controlling the flying height of a head slider and the information storage apparatus according to the embodiments of the present invention. A combination of the recording head 121 and the playback head 122 is an example of a "recording-playback element" in the information storage apparatus according to the embodiment of the present invention, and a combination of the flying-height controlling unit 150 and the memory 160 is an example of a "control circuit" in the information storage apparatus according to the embodiment of the present invention.

The flying-height controlling unit 150 includes a signal level calculator 151, a sample generator 152, a heater sensitivity calculator 153, a variation-in-heater-sensitivity determiner 154, a control value calculator 155, and a heater controller 156. The signal level calculator 151 calculates the level of the playback signal. The sample generator 152 generates two pairs of the calculated playback signal level and different values of the power to be supplied to the heater 123 and records the generated pairs in the memory 160. The heater sensitivity calculator 153 calculates a heater sensitivity corresponding to the supplied power desirable to generate the heat that is sufficient to decrease the flying height by a unit height. The variation-in-heater-sensitivity determiner 154 determines, based on the heater sensitivity, whether the magnetic disk apparatus 100 is in a reduced pressure state in which the air pressure in the magnetic disk apparatus 100 is so low that the air pressure affects the adjustment of the flying height. The control value calculator 155 calculates the value of the power to be supplied to the heater 123, necessary to make the flying height of the head slider 120 equal to the reference flying height based on the determination result by the variation-in-heater-sensitivity determiner 154 and the playback signal level. The heater controller 156 generates the power of the value calculated by the control value calculator 155 and supplies the generated power to the heater 123.

In the playback of information by the playback head 122 in the magnetic disk apparatus 100 shown in FIG. 1, a process of adjusting the flying height of the head slider 120 by the flying-height controlling unit 150, described below, is repeatedly performed in parallel with information playback processing, such as decoding of the playback signal.

An adjustment process at an arbitrary time point in the adjustment process repeatedly performed by the flying-height controlling unit 150 will now be described.

The signal level calculator 151 in FIG. 1 performs full-wave rectification and smoothing of the playback signal, which is a voltage signal having two levels: a high level and a low level, to calculate the level of the playback signal. The calculated playback signal level is supplied to the sample generator 152.

The sample generator 152 in FIG. 1 generates two pairs (combination) that include the playback signal level and different values of the power to be supplied to the heater 123, as described above. Of the two pairs, the current playback signal level (a first signal level) and the value of the power currently supplied to the heater 123 (a first power value) form one pair and the other pair is generated in the following manner. First, the sample generator 152 instructs the heater controller 156 to increase the power to be supplied to the heater 123 by a certain amount and to supply the increased power to the heater 123. When the heater controller 156 supplies the power increased by the certain amount to the heater 123 in response to the instruction, the sample generator 152 uses a pair of the signal level (a second signal level) and the value of the power supplied to the heater 123 (a second power value) at this time point as the other pair and, then, instructs the heater controller 156 to return the value of the power supplied to the heater 123 to the original value.

Figure 3:
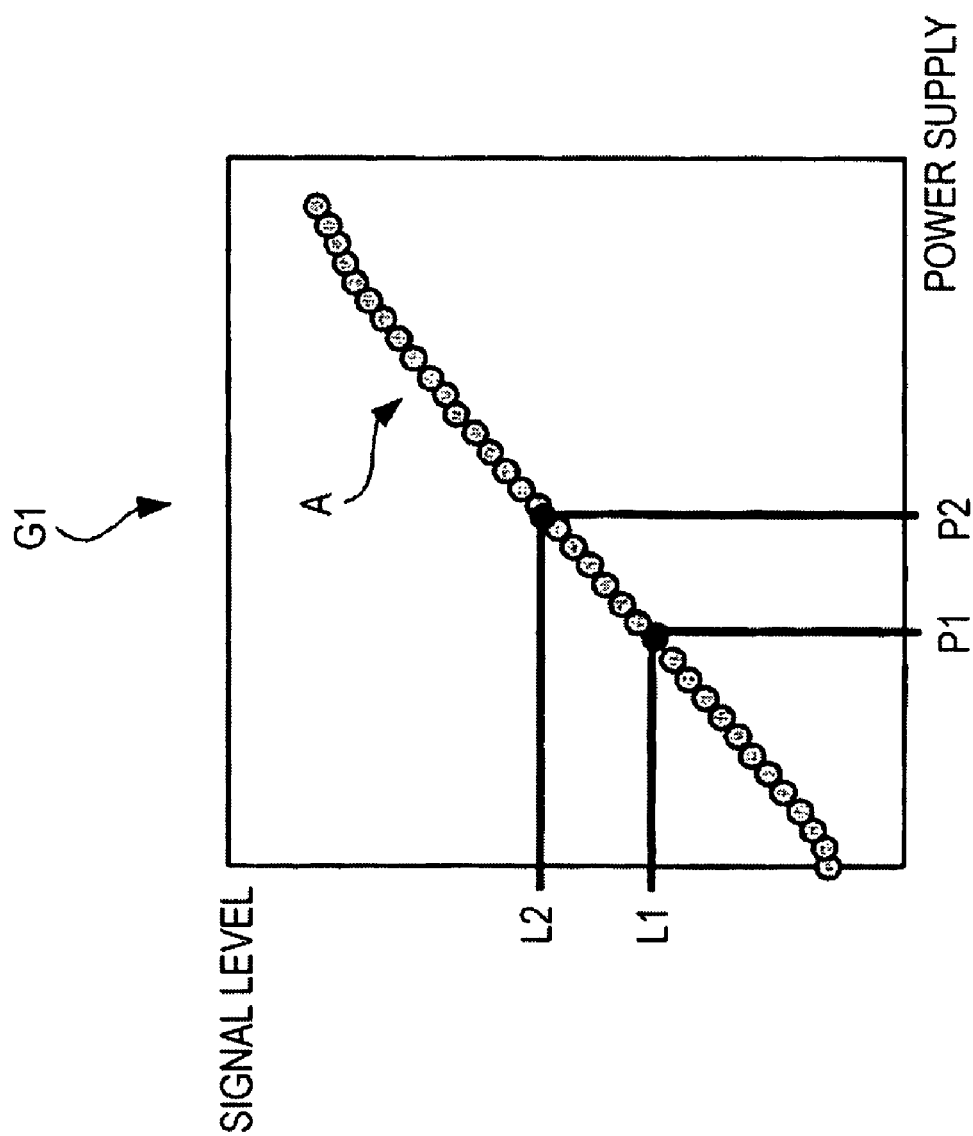
FIG. 3 is a graph depicting the relationship between the value of power to be supplied to a heater and the level of a playback signal.

FIG. 3 is a graph depicting the relationship between the value of the power to be supplied to the heater 123 and the playback signal level.

The vertical axis represents the level of a playback signal and the horizontal axis represents the value of supplied power in a graph G1 depicted in FIG. 3. A plot sequence A composed of multiple plot points representing the signal levels corresponding to the values of the supplied power is drawn on the graph G1. As apparent from the plot sequence A, the playback signal level increases with the increasing supplied power. In the graph G1, a pair of the first signal level and the first power value generated by the sample generator 152 is represented as reference numerals "L1" and "P1," and a pair of the second signal level and the second power value generated by the sample generator 152 is represented as reference numerals "L2" and "P2".

According to the present embodiment, a signal-power correspondence table composed of the multiple pairs of the playback signal levels and the values of supplied power, corresponding to the plot sequence A on the graph G1, is created by a manufacturer during the manufacture of the magnetic disk apparatus 100 and the signal-power correspondence table is stored in the memory 160. According to the present embodiment, in the creation of the signal-power correspondence table by the manufacturer, the signal level at each value of the supplied power is calculated by using the functions of the sample generator 152 and the heater controller 156 while varying the value of the supplied power by a certain amount at a certain normal air pressure to create the multiple pairs of the signal levels and the values of the supplied power.

The signal-power correspondence table is used in the processing in the control value calculator 155 described below. The two pairs generated by the sample generator 152 in FIG. 1 are stored in the memory 160 and are used for calculation of the heater sensitivity in the heater sensitivity calculator 153.

The heater sensitivity calculator 153 in FIG. 1 performs the calculation of the heater sensitivity in the following manner.

The above two pairs of the playback signal levels and the values of the supplied power are read out from the memory 160. The heater sensitivity calculator 153 calculates the amount of variation in the flying height when the value of the power to be supplied to the heater 123 is varied from the first power value to the second power value by substituting the signal level corresponding to each power value into Formula 1.

[Formula 1]

$$dSP(\text{nm}) = \frac{\left\{\left(\frac{2\pi \cdot R(\text{nm}) \cdot r(rpm) \cdot 1000}{60}\right) \middle/ (2\pi \cdot F(\text{Hz}))\right\} \times \ln\left(\frac{L2}{L1}\right)}{1000} \quad (1)$$

Formula 1 is called Walles equation. In Formula 1, "dSP (nm)" denotes the amount of variation in the flying height, "R(nm)" denotes the distance from the center of the magnetic disk 110 to the playback head 122 in the in-plane direction, and "r(rpm)" denotes the rotation speed of the magnetic disk 110. "F(Hz)" denotes the frequency of the playback signal when information in which the magnetization is alternately inverted is recorded on the magnetic disk 110. "L1" denotes the first signal level and "L2" denotes the second signal level.

After the heater sensitivity calculator 153 calculates the variation in the flying height according to Formula 1, the heater sensitivity calculator 153 divides the amount of variation in the power supplied to the heater 123 causing the amount of variation in the flying height by the amount of variation in the flying height according to Formula 2 to calculate the heater sensitivity corresponding to the supplied power necessary to generate heat that is sufficient to decrease the flying height by a unit height.

[Formula 2]

$$HS = \frac{P2(\text{mW}) - P1(\text{mW})}{dSP(\text{nm})} \quad (2)$$

In Formula 2, "HS(mW/nm)" denotes the heater sensitivity, "dSP(nm)" denotes the amount of variation in the flying height, as in Formula 1, "P1(mW)" denotes the first power value, and "P2(mW)" denotes the second power value.

The heater sensitivity calculator 153 calculates the current heater sensitivity according to a series of calculations. The heater sensitivity calculator 153 supplies the calculated heater sensitivity to the variation-in-heater-sensitivity determiner 154.

In general, when the tip section 120a of the head slider 120 shown in FIG. 2 protrudes, the entire head slider 120 is raised due to the air flow between the head slider 120 and the magnetic disk 110 to produce a force to increase the flying height of the entire head slider 120 including the tip section 120a.

The flying height of the entire head slider 120 is decreased as the air pressure in the magnetic disk apparatus 100 is decreased. This is because the decrease in the air pressure decreases the amount of the air flowing between the head slider 120 and the magnetic disk 110 and, as a result, the force to float the head slider 120 over the magnetic disk 110 is decreased thus lowering the head slider 120. When the head slider 120 is lowered, the flow path of the air between the head slider 120 and the magnetic disk 110 tends to move close to produce a force to increase the flying height of the entire head slider 120 that has been lowered.

Consequently, the force to increase the flying height of the entire head slider 120, produced by the protrusion of the tip section 120a, is increased when the air pressure in the magnetic disk apparatus 100 is decreased. As a result, a phenomenon is induced in which it is hard to decrease the flying height of the tip section 120a even if the power is supplied to the heater 123 and the tip section 120a protrudes. In other words, the heater sensitivity decreases with the decreasing air pressure in the magnetic disk apparatus 100.

A first correlation table representing the correlation between the air pressure in the magnetic disk apparatus 100 and the heater sensitivity is stored in the memory 160 shown in FIG. 1. The first correlation table is composed of pairs of multiple values of the air pressure and the heater sensitivities at the multiple values of the air pressure.

Figure 4:
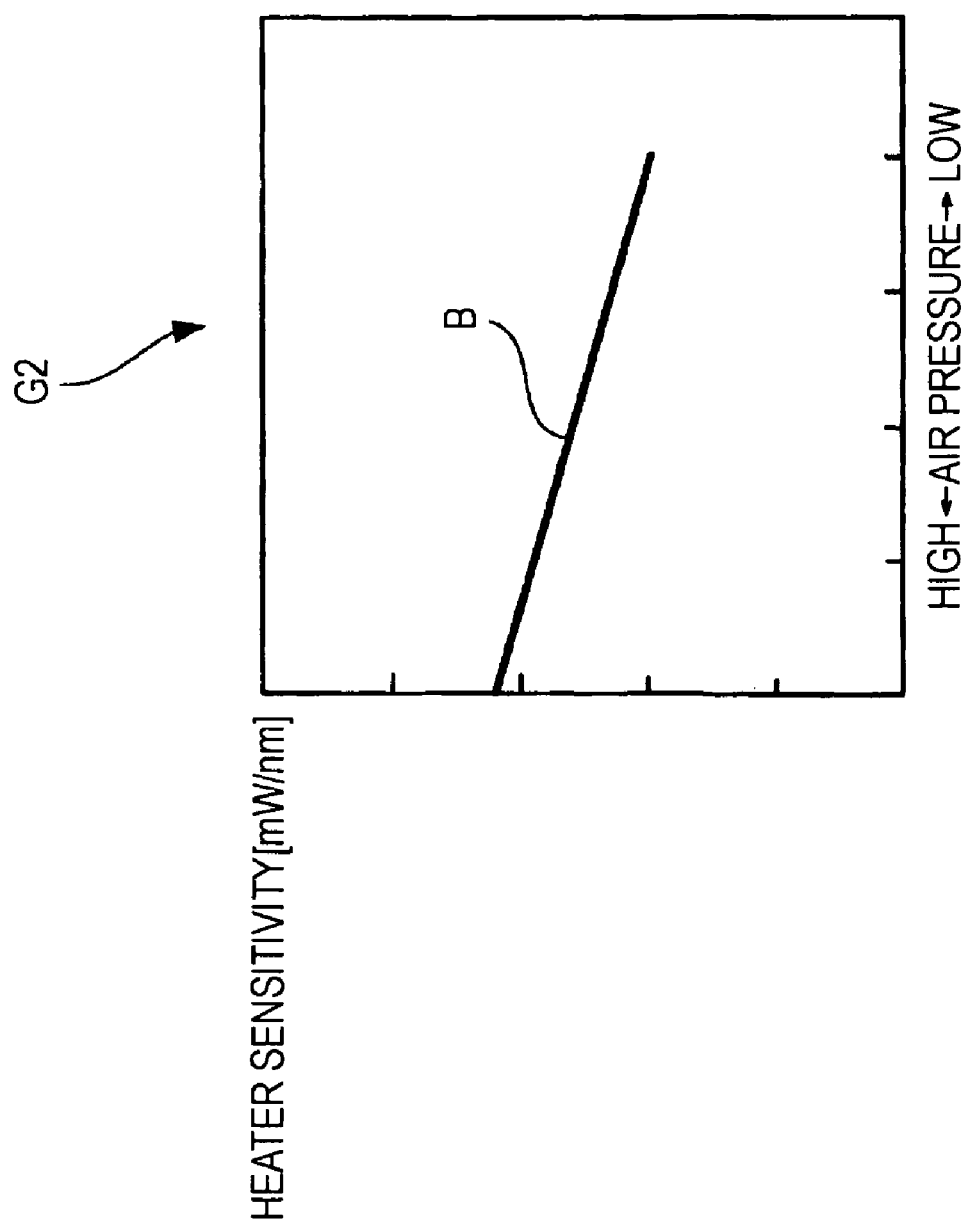
FIG. 4 is a graph representing the content defined in a first correlation table.

FIG. 4 is a graph representing the content defined in the first correlation table.

The vertical axis represents the heater sensitivity and the horizontal axis represents the air pressure in the magnetic disk apparatus 100 in a graph G2 shown in FIG. 4. The correlation between the air pressure and the heater sensitivity, in which the heater sensitivity is decreased with the decreasing air pressure, is represented by a solid line B on the graph G2. The correlation is defined by the pairs of the multiple values of the air pressure and multiple heater sensitivities in the first correlation table.

According to the present embodiment, the first correlation table is created by the manufacturer at the manufacturing of the magnetic disk apparatus 100 and the first correlation table is stored in the memory 160. According to the present embodiment, in the creation of the first correlation table by the manufacturer, the heater sensitivity at each value of the air pressure is calculated by using the functions of the sample generator 152 and the heater sensitivity calculator 153 while varying the air pressure in the magnetic disk apparatus 100 by a certain amount. The creation of the first correlation table is an example of a "step of measuring a first correlation value" in the method of controlling the flying height of a head slider according to the embodiment of the present invention. The first correlation table is an example of a "first correlation value" in the method of controlling the flying height of a head slider and the information storage apparatus according to the embodiments of the present invention.

The variation-in-heater-sensitivity determiner 154 in FIG. 1 reads out the first correlation table from the memory 160 upon reception of the current heater sensitivity from the heater sensitivity calculator 153.

When the air pressure in the magnetic disk apparatus 100 is decreased, the flying height of the entire head slider 120, that is, the flying height of the tip section 120a is decreased, as described above. The flying height of the tip section 120a is called the flying height of the head slider 120 in the present embodiment of the present invention. Accordingly, the adjustment of the flying height in the same manner as at the normal air pressure when the air pressure in the magnetic disk apparatus 100 is very low can cause the tip section 120a of the head slider 120 to become too close to the magnetic disk 110. In the extreme case, a problem can be caused in which the tip section 120a contacts the magnetic disk 110.

The heater sensitivity is decreased when the air pressure in the magnetic disk apparatus 100 is decreased, as shown in the first correlation table given by the actual measurement at the manufacturing. The variation-in-heater-sensitivity determiner 154 uses this characteristic to determine whether the magnetic disk apparatus 100 is in a reduced pressure state in which the above problem can be caused.

Specifically, first, the variation-in-heater-sensitivity determiner 154 obtains the heater sensitivity (reference heater sensitivity) corresponding to a specific normal air pressure from the first correlation table read out from the memory 160, and temporarily stores the reference heater sensitivity in the memory 160. The process of obtaining the reference heater sensitivity from the first correlation table and temporarily storing the reference heater sensitivity in the memory 160 is an example of a "step of calculating a reference heating-element sensitivity" in the method of controlling the flying height of a head slider according to the embodiment of the present invention. The reference heater sensitivity is an example of a "reference heating-element sensitivity" in the method of controlling the flying height of a head slider and the information storage apparatus according to the embodiments of the present invention.

Next, the variation-in-heater-sensitivity determiner 154 reads out, from the memory 160, the reference heater sensitivity that is temporarily stored and calculates the difference between the current heater sensitivity supplied from the heater sensitivity calculator 153 and the reference heater sensitivity.

The variation-in-heater-sensitivity determiner 154 holds the difference between the heater sensitivity at a lowest air pressure at which the flying height can be adjusted without causing the above problem and the heater sensitivity at the normal air pressure as a threshold value. The variation-in-heater-sensitivity determiner 154 compares the difference between the current heater sensitivity and the reference heater sensitivity with the threshold value and determines that the magnetic disk apparatus 100 is in the reduced pressure state if the difference exceeds the threshold value. When the variation-in-heater-sensitivity determiner 154 determines that the magnetic disk apparatus 100 is in the reduced pressure state, the variation-in-heater-sensitivity determiner 154 calculates the amount of variation in the air pressure corresponding to the difference between the current heater sensitivity and the reference heater sensitivity from the first correlation table.

Figure 5:
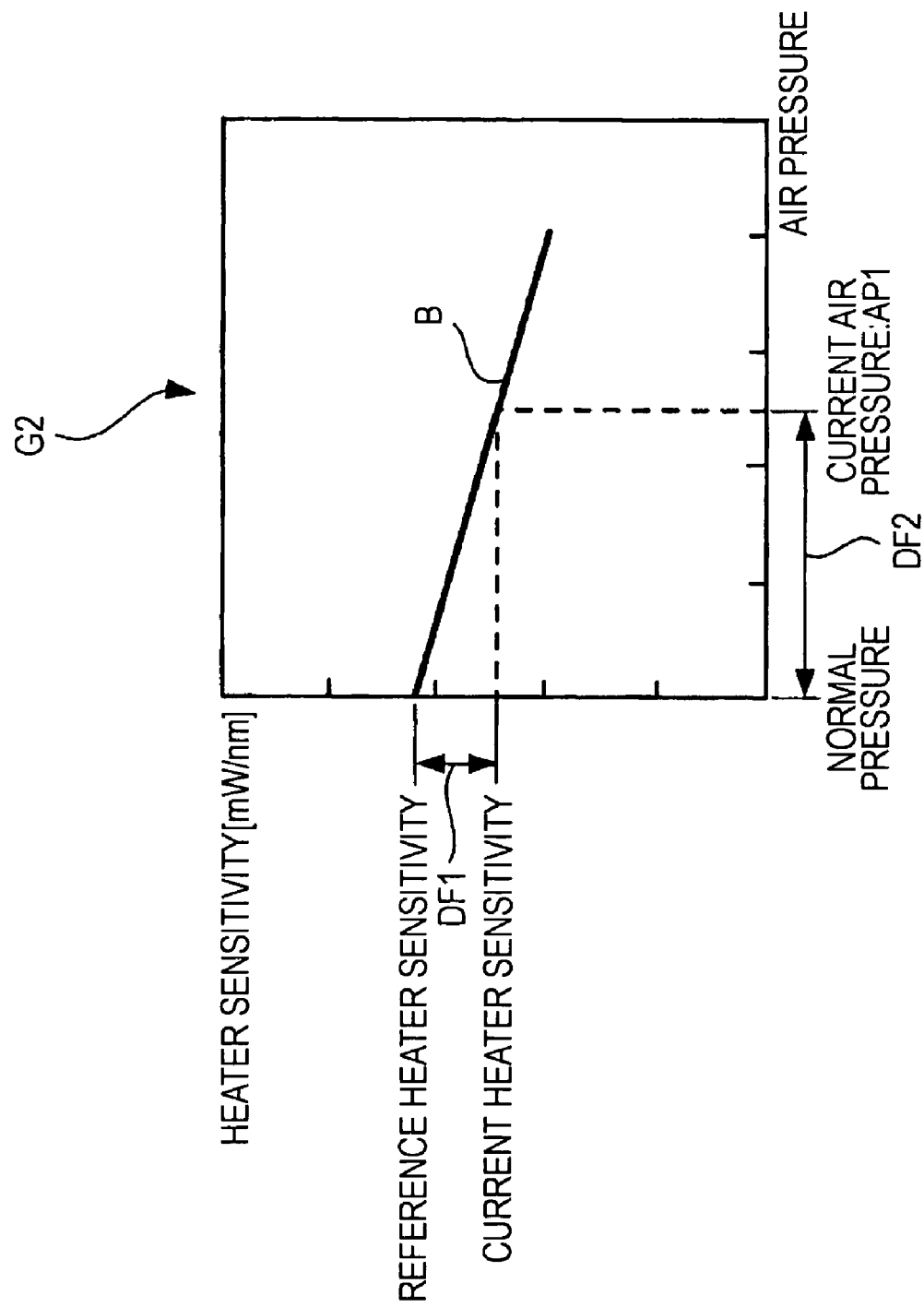
FIG. 5 is a graph describing how to calculate the amount of variation in air pressure corresponding to the difference between the current heater sensitivity and a reference heater sensitivity from the first correlation table.

FIG. 5 is a graph describing how to calculate the amount of variation in the air pressure corresponding to the difference between the current heater sensitivity and the reference heater sensitivity from the first correlation table.

The graph G2 shown in FIG. 4 is also depicted in FIG. 5. A line B representing the content defined in the first correlation table is drawn in the graph G2 in FIG. 5.

After a difference DF1 in heater sensitivity between the current heater sensitivity and the reference heater sensitivity is calculated in the above manner, the difference in the air pressure corresponding to the difference DF1 is obtained as an amount of variation DF2 in air pressure, as conceptually shown in the content defined in the first correlation table represented by the line B on the graph G2. In addition, according to the present embodiment, a current air pressure AP1 conceptually corresponding to the current heater sensitivity on the graph G2 is also obtained from the first correlation table.

The series of processing in which the difference DF1 between the current heater sensitivity and the reference heater sensitivity is calculated, whether the magnetic disk apparatus 100 is in the reduced pressure state or not is determined, and the amount of variation DF2 in air pressure is calculated is an example of a "step of calculating an amount of variation in air pressure" in the method of controlling the flying height of a head slider according to the embodiment of the present invention. The above threshold value is an example of a "threshold value" in the method of controlling the flying height of a head slider according to the embodiment of the present invention and the amount of variation DF2 in air pressure is an example of an "amount of variation in air pressure" in the method of controlling the flying height of a head slider and the information storage apparatus according to the embodiments of the present invention.

When the above series of processing is completed, the variation-in-heater-sensitivity determiner 154 notifies the control value calculator 155 of the determination result and, if the amount of variation DF2 in air pressure is calculated, supplies the amount of variation DF2 in air pressure to the control value calculator 155 along with the current air pressure AP1.

As described above, the flying height of the entire head slider 120 is generally decreased as the air pressure in the magnetic disk apparatus 100 is decreased.

A second correlation table representing the correlation between the air pressure in the magnetic disk apparatus 100 and the flying height of the head slider 120 is stored in the memory 160 shown in FIG. 1. The second correlation table is composed of pairs of multiple values of the air pressure and the flying heights at the multiple values of the air pressure.

Figure 6:
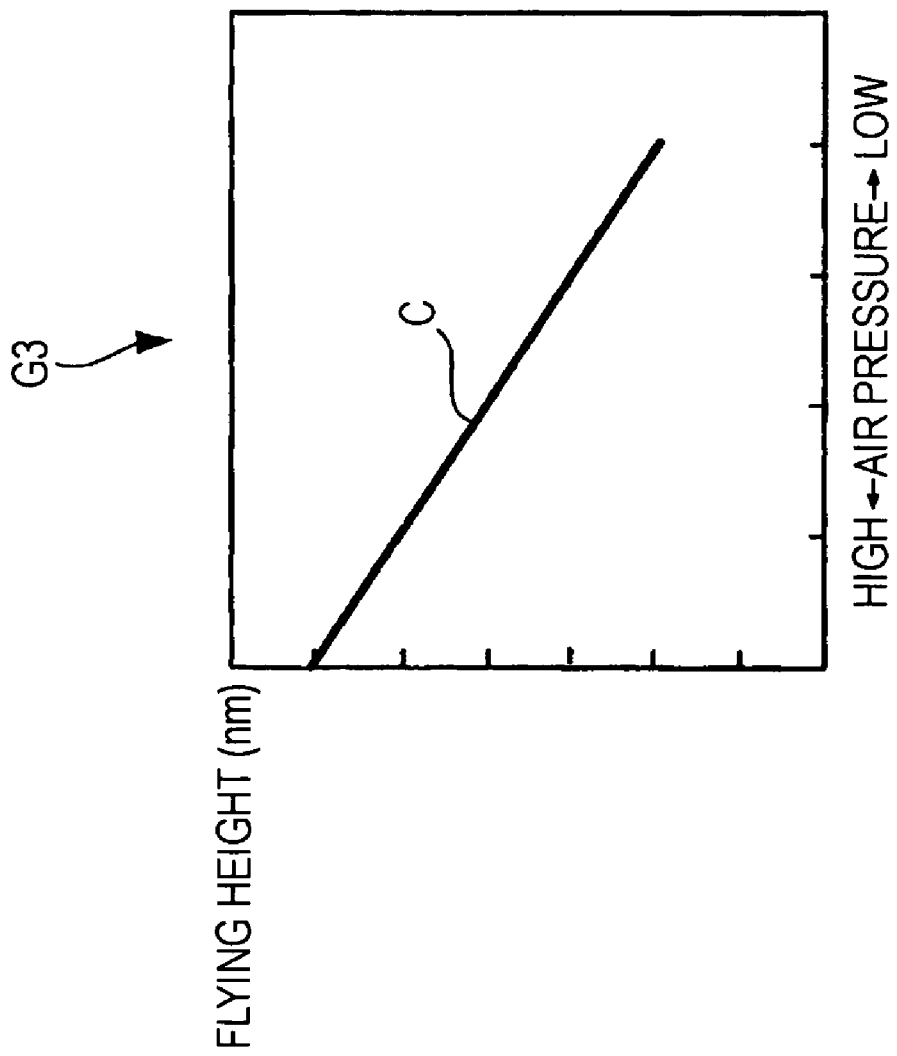
FIG. 6 is a graph representing the content defined in a second correlation table.

FIG. 6 is a graph representing the content defined in the second correlation table.

The vertical axis represents the flying height of the head slider 120 and the horizontal axis represents the air pressure in the magnetic disk apparatus 100 in a graph G3 shown in FIG. 6. The correlation between the air pressure and the flying height, in which the flying height is decreased with the decreasing air pressure, is represented by a solid line C on the graph G3. The correlation is defined by the pairs of the multiple values of the air pressure and multiple flying heights in the second correlation table.

According to the present embodiment, the second correlation table is created by the manufacturer at the manufacturing of the magnetic disk apparatus 100 and the second correlation table is stored in the memory 160. According to the present embodiment, in the creation of the second correlation table by the manufacturer, the maximum flying height at each value of the air pressure when the heater 123 does not generate heat is measured by a touch-down method described below while varying the air pressure in the magnetic disk apparatus 100 by a certain amount.

In the measurement of the maximum flying height by the touch-down method, the heater controller 156 shown in FIG. 1 is caused to increase the power to be supplied to the heater 123 until the head slider 120 contacts the magnetic disk 110 and the power value when the head slider 120 contacts the magnetic disk 110 is divided by the heater sensitivity to provide the maximum flying height. The contact between the head slider 120 and the magnetic disk 110 is recognized by detecting a fluctuation of the playback signal generated by the playback head 122 when the head slider 120 contacts the magnetic disk 110 by a detecting unit (not shown). According to the present embodiment, the measurement of the maximum flying height by the touch-down method is performed at each value of the air pressure to create the second correlation table. The creation of the second correlation table is an example of a "step of measuring a second correlation value" in the method of controlling the flying height of a head slider according to the embodiment of the present invention. The second correlation table is an example of a "second correlation value" in the method of controlling the flying height of a head slider and the information storage apparatus according to the embodiments of the present invention.

The control value calculator 155 in FIG. 1 reads out the signal-power correspondence table from the memory 160 upon reception of the determination result from the variation-in-heater-sensitivity determiner 154. If the determination result indicates that the magnetic disk apparatus 100 is not in the reduced pressure state, the control value calculator 155 calculates the value of the power to be supplied to the heater 123, which is necessary to make the flying height of the head slider 120 equal to the reference flying height, by the following process.

The control value calculator 155 first calculates the difference between the current playback signal level calculated by the signal level calculator 151 and the specific reference level. Next, the control value calculator 155 obtains the power value corresponding to the above difference from the signal-power correspondence table. The control value calculator 155 adds the obtained power value to the value of the power currently supplied to the heater 123 to calculate the value of the supplied power necessary to make the flying height of the head slider 120 equal to the reference flying height at which the playback signal level is equal to the reference level. The control value calculator 155 notifies the heater controller 156 of the calculated value of the supplied power.

If the determination result supplied from the variation-in-heater-sensitivity determiner 154 indicates that the magnetic disk apparatus 100 is in the reduced pressure state, the control value calculator 155 reads out the second correlation table from the memory 160.

In this case, the control value calculator 155 uses the signal-power correspondence table, the second correlation table, and the amount of variation DF2 in air pressure and the current air pressure AP1 supplied with the determination result to calculate the value of the supplied power necessary to make the flying height of the head slider 120 equal to the reference flying height at which the playback signal level is equal to the reference level in the following manner.

The control value calculator 155 obtains the power value corresponding to the difference between the current playback signal level and the reference level by the above process using the signal-power correspondence table.

If the magnetic disk apparatus 100 is in the reduced pressure state, the flying height of the entire head slider 120 is lower than that at the normal air pressure. The power value obtained by the above process corresponds to an amount of adjustment for the flying height of the tip section 120*a* of the head slider 120 (the flying height of the head slider 120) and to offset the difference between the current playback signal level and the reference level at the normal air pressure. Accordingly, the adjustment of the flying height of the head slider 120, which is decreased in the reduced pressure state, by using the amount of adjustment at the normal air pressure causes the flying height of the head slider 120 to be lower than the reference flying height. In the extreme case, the tip section 120*a* may contact the magnetic disk 110. In order to resolve such a problem, according to the present embodiment, when the magnetic disk apparatus 100 is in the reduced pressure state, the amount of decrease in the flying height of the tip section 120*a* due to the reduced pressure state is calculated and the amount of adjustment at the normal air pressure is corrected by an amount corresponding to the amount of decrease to adjust the flying height of the head slider 120 to the reference flying height.

The process of correcting the amount of adjustment (the power value) at the normal air pressure will now be described.

In this correction process, the second correlation table, the amount of variation DF2 in air pressure, and the current air pressure AP1 are used to obtain the correction value for the amount of adjustment at the normal air pressure.

Figure 7:
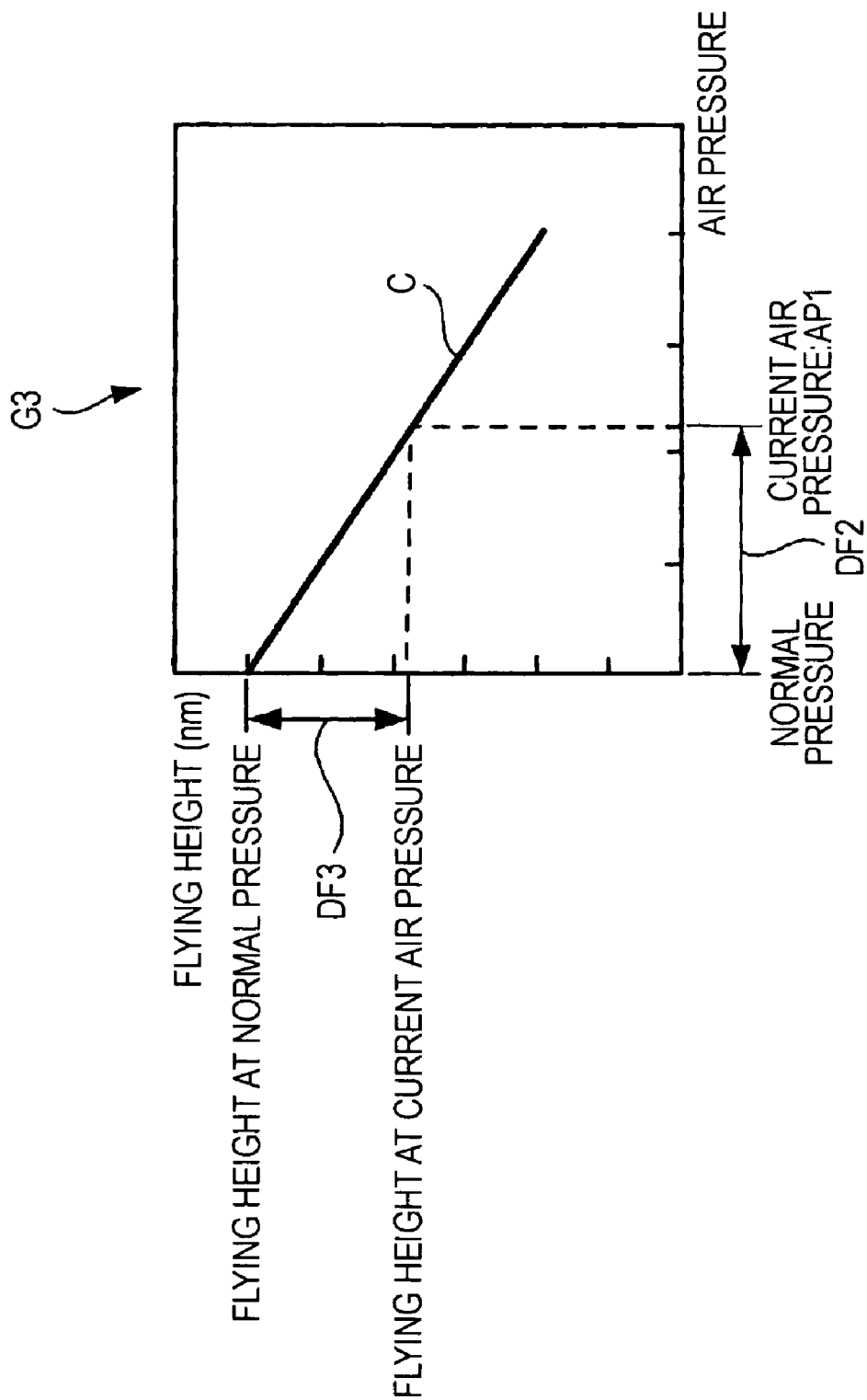
FIG. 7 is a graph describing how to obtain a correction value for an amount of adjustment at normal air pressure by using the second correlation table, the amount of variation in air pressure, and the current air pressure.

FIG. 7 is a graph describing how to obtain the correction value for the amount of adjustment at the normal air pressure by using the second correlation table, the amount of variation DF2 in air pressure, and the current air pressure AP1.

The graph G3 shown in FIG. 6 is shown also in FIG. 7. A line C representing the content defined in the second correlation table is drawn in the graph G3 in FIG. 7.

In the content defined in the second correlation table, as conceptually shown on the graph G3, the amount of variation DF2 in air pressure indicating the difference between the normal air pressure and the current air pressure AP1 corresponds to an amount of decrease DF3 in the flying height due to the reduced pressure state, which is the difference between the maximum flying height at the normal air pressure and the maximum flying height at the current air pressure AP1. Accordingly, the amount of decrease in the flying height corresponding to the amount of variation DF2 in air pressure in the content defined in the second correlation table can be obtained to determine the amount of decrease DF3 in the flying height due to the reduced pressure state.

After the control value calculator 155 obtains the amount of decrease DF3 in the flying height, the control value calculator 155 multiplies the amount of decrease DF3 by the current heater sensitivity to obtain the value of the power to be supplied to the heater 123 on the assumption that the amount of decrease DF3 is realized by the power supply to the heater 123. The obtained value corresponds to the correction value for the amount of adjustment at the normal air pressure.

The control value calculator 155 subtracts the correction value obtained in the above manner from the amount of adjustment (the power value) at the normal air pressure calculated by the above process using the signal-power correspondence table. The control value calculator 155 adds the amount of adjustment (the power value) corrected by the subtraction to the value of the power currently supplied to the heater 123 to calculate the value of the supplied power necessary to make the flying height of the head slider 120 equal to the reference flying height at which the playback signal level is equal to the reference level. The control value calculator 155 notifies the heater controller 156 of the calculated value of the supplied power.

The heater controller 156 in FIG. 1 generates the power of the value calculated by the control value calculator 155 and supplies the generated power to the heater 123. As a result, it is possible to adjust the flying height of the head slider 120 to the reference flying height not only at the normal air pressure but also in the reduced pressure state described above.

The processes performed by the control value calculator 155 and the heater controller 156 correspond to a "step of adjusting the flying height of the head slider" in the method of controlling the flying height of a head slider according to the embodiment of the present invention. The adjustment process performed by the flying-height controlling unit 150, the process of creating the first correlation table by the manufacturer, and the process of creating the second correlation table by the manufacturer correspond to the method of controlling the flying height of a head slider according to the embodiment of the present invention.

The magnetic disk apparatus 100 according to the embodiment of the present invention described above can precisely calculate the amount of variation in the air pressure in the magnetic disk apparatus 100 from the amount of variation in the heater sensitivity precisely calculated by using the Walles equation. Since the flying height of the head slider 120 can be adjusted based on the amount of variation in the air pressure, the flying height can be adjusted with a higher sensitivity to the air pressure. In addition, the magnetic disk apparatus 100 according to the embodiment of the present invention can perform the precise adjustment of the flying height without introducing a special apparatus, such as a pneumatic sensor. Accordingly, the magnetic disk apparatus 100 can perform the adjustment of the flying height with a higher sensitivity to the air pressure at lower cost.

Although the first correlation value and the second correlation value in the embodiments of the present invention are illustrated by the first correlation table composed of the pairs of the multiple values of the air pressure in the magnetic disk apparatus 100 and the heater sensitivities at the multiple values of the air pressure and the second correlation table composed of the pairs of the multiple values of the air pressure in the magnetic disk apparatus 100 and the flying heights at the multiple values of the air pressure, respectively, the first correlation value and the second correlation value in the embodiments of the present invention are not restricted to the first and second correlation tables. The first correlation value and the second correlation value in the embodiments of the present invention may be a correlation table composed of pairs of multiple values of the altitude where the magnetic disk apparatus 100 is installed and the heater sensitivities at the multiple values of the altitude and a correlation table composed of pairs of multiple values of the altitude and the flying heights at the multiple values of the altitude, respectively.

The first correlation value and the second correlation value in the embodiments of the present invention are not restricted to the tables, such as the first correlation table and the second correlation table. For example, the first correlation value and the second correlation value in the embodiments of the present invention may be mathematical expressions of the correlation between the air pressure and the heater sensitivity and the correlation between the air pressure and the flying height by a certain approximation method.

As described above, according to the present invention, it is possible to adjust the flying height of the portion where the magnetic head is mounted on the head slider from a recording medium, such as a magnetic disk, with a higher sensitivity to the air pressure.

Although only the information storage apparatus according to one embodiment of the present invention is described, the information storage apparatus can be realized by the embodiments corresponding to the embodiments of the method of controlling the flying height of a head slider.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method of controlling a flying height of a head slider having a heating element that controls the flying height, the method comprising the steps of:
    measuring a first correlation value between an air pressure and a heating element sensitivity of the head slider;
    measuring a second correlation value between the air pressure and the flying height of the head slider;
    calculating a reference heating-element sensitivity at normal air pressure from the first correlation value;
    measuring a current heating element sensitivity of the heating element when the head slider is lifted and calculating the difference between the current heating element sensitivity and the reference heating-element sensitivity to calculate an amount of variation in air pressure from the first correlation value; and
    calculating an amount of variation in the flying height of the head slider from the amount of variation in air pressure and the second correlation value and controlling the heating element to adjust the flying height of the head slider.

2. The method of controlling a flying height of a head slider according to claim 1,
    wherein a threshold value is set for the difference between the heating element sensitivity and the reference heating-element sensitivity and, if the difference exceeds the threshold value, the flying height of the head slider is adjusted.

3. The method of controlling a flying height of a head slider according to claim 1,
    wherein the first correlation value or the second correlation value is measured by a touch-down method.

4. An information storage apparatus comprising:
    a head slider having a recording-playback element and a heating element controlling a flying height of the head slider;
    a storage medium on which information is stored; and
    a control circuit including a memory,
    wherein the control circuit measures a first correlation value between an air pressure and a heating element sensitivity of the head slider and stores the first correlation value in the memory; measures a second correlation value between the air pressure and the flying height of the head slider and stores the second correlation value in the memory; calculates a reference heating-element sensitivity at normal air pressure from the first correlation value and stores the reference heating-element sensitivity in the memory; measures a current heating element sensitivity of the heating element when the head slider is lifted and calculates the difference between current the heating element sensitivity and the reference heating-element sensitivity to calculate an amount of variation in air pressure from the first correlation value, and stores the amount of variation in air pressure in the memory; and calculates an amount of variation in the flying height of the head slider from the amount of variation in air pressure and the second correlation value and controls the heating element to adjust the flying height of the head slider.

* * * * *